United States Patent [19]

Cochrane et al.

[11] 4,393,279

[45] Jul. 12, 1983

[54] DIGITAL DATA TRANSMISSION SYSTEM HAVING FREQUENCY OR PHASE MODULATED DATA CARRYING SIGNALS TO PROVIDE SUPERVISORY CHANNEL

[75] Inventors: Peter Cochrane; James A. Kitchen, both of Ipswich, England

[73] Assignee: The Post Office, England

[21] Appl. No.: 271,107

[22] Filed: Jun. 8, 1981

[30] Foreign Application Priority Data

Jun. 16, 1980 [GB] United Kingdom ............... 8019610

[51] Int. Cl.$^3$ .............................................. H04B 3/46
[52] U.S. Cl. .......................................... 179/175.31 R
[58] Field of Search .............. 179/175.31 R, 175.31 F, 179/175.3 R

[56] References Cited

U.S. PATENT DOCUMENTS 3,392,242 7/1968 Smith et al. ................ 179/175.31 R
3,916,120 10/1975 Morris ......................... 179/175.31 R
4,079,203 3/1978 Dragoo .
4,122,358 10/1978 Altmann .

FOREIGN PATENT DOCUMENTS 18295 10/1980 European Pat. Off. .
2902020 7/1980 Fed. Rep. of Germany .

OTHER PUBLICATIONS

"3A-RDS 11 GHz Digital Radio System," by A. J. Giger & T. L. Osborne, pp. 18-1 through 18-7.
"A 120 Mb/s Digital Transmission System on Coaxial Cable" by P. J. Wakeling, *Point to Point Communications*, Jan. 18, 1974, No. 1, pp. 18-29.
"800 MHx S.A.W. Timing Filter for Optical Fibre Transmission System" by J. Minowa and K. Nakagawa, *Electronics Letters*, Jan. 3, 1980, vol. 16, No. 1.

*Primary Examiner*—Thomas A. Robinson
*Attorney, Agent, or Firm*—Cushman, Darby & Cushman

[57] ABSTRACT

A supervisory channel is provided on a digital transmission system by frequency modulation of the data signal transmitted along a transmission link which includes repeaters. The frequency modulation can be carried out using an elastic store. Each repeater includes means for demodulating the frequency modulation so that each repeater can be addressed and interrogated. Each repeater can also phase modulate the data signals on the return link to a terminal station so that signals indicative of an interrogated condition can be transmitted to the terminal station.

16 Claims, 4 Drawing Figures

DIGITAL DATA TRANSMISSION SYSTEM HAVING FREQUENCY OR PHASE MODULATED DATA CARRYING SIGNALS TO PROVIDE SUPERVISORY CHANNEL

DESCRIPTION

This invention relates to digital transmission systems and in particular relates to the provision of a supervisory or service channel on such a system which allows interrogation of repeaters on a digital transmission link.

Service or supervisory channels are installation and maintenance aids which provide one or more channels for engineers to carry out work on a transmission system. They can be used as an engineering speaker circuit allowing communication between engineers who may be involved in repair or test work at distant locations or for carrying supervisory signals such as repeater failure alarms, system performance monitoring and power supply regulation and control.

Up to the present time the majority of digital transmission systems implemented using cables have utilised additional metallic information bearers for supervisory purposes. Because of the inherently low data rate of the supervisory channel, the additional transmission path is generally provided by interstice or spare twisted pairs. It is unlikely that such a path will be available in the case of submarine fibre optic systems as the provision of either a coaxial "king wire" or an additional spare fibre present a number of practical limitations. For example:

i. The "king wire" approach is analogous to the implementation of an existing submarine fdm system with all the attendant problems associated with power separation filters and both way amplification. It also presents formidable problems in terms of system reliability requirements as the failure of any single unit could result in the loss of the supervisory channel to all fibre optic transmission paths.

ii. An additional (spare) fibre approach is also particularly vulnerable if a fibre break occurs in the one carrying the supervisory information. In addition, economic considerations generally dictate the use of all fibres for revenue earning traffic.

The present invention utilises a technique which does not require an additional wire or fibre for supervisory purposes. In the system of the present invention a supervisory channel is provided by frequency or phase modulation of the data signal. This offers a particularly simple means of communicating over the main data path and permits addressing and interrogation of repeaters with a minimum of additional repeater hardware. In particular the use of frequency or phase modulation of the system data rate offers an extremely flexible and tractable implementation.

According to one aspect of the present invention there is provided a digital transmission system having send and receive equipment at terminal stations connected by a digital link which includes one or more repeaters, wherein the send equipment includes means for frequency or phase modulating the data signals to be transmitted along the link, and the or each repeater includes means for demodulating the frequency or phase modulation, said modulation providing a supervisory channel by means of which the repeaters can be addressed and interrogated.

The supervisory channel may be arranged to carry a plurality of tones, each tone or combination of tones being associated with a particular repeater, and each repeater includes means for sensing its tone or combination of tones so that each repeater can be addressed independently. The supervisory channel may be arranged to carry one or more further tones, each further tone being for interrogating a given condition of the repeater. Each repeater may include means for gating said further tones to a logic circuit by means of a signal from said sensing means, said logic circuit being responsive to said interrogation tone or tones to provide signals indicative of the interrogated conditions. Each repeater may include means for phase modulating the data signals on the data link in accordance with the signals from said logic means whereby said condition indicative signals can be transmitted to said receive equipment.

The frequency modulating means may include a memory whose read-out rate can be arranged to vary relative to its read-in rate. The receive equipment may also include a store whose read-out rate can be arranged to vary relative to its read-in rate. The stores may be elastic stores.

At the send end the elastic store can be arranged such that data signals are read in at the clock rate and are read out at that clock rate modulated in accordance with a signal to be transmitted on the service or supervisory channel. At the receive end the elastic store reads in at the modulated rate and reads out at the unmodulated rate and operates under the control of a clock extraction circuit and demodulator which recovers the original modulating signal and regenerates the clock rate.

According to another aspect of the present invention there is provided a method of interrogating repeaters on a digital transmission link connecting terminal stations, said method comprising frequency or phase modulating the data signals transmitted from a terminal station to provide a supervisory channel and demodulating said frequency or phase modulation at each repeater to obtain signals for interrogating a condition or conditions in the repeater.

The method may include the step of phase or frequency modulating data signals on the return path from each repeater to the terminal station in accordance with signals indicative of the interrogated condition.

According to a further aspect of the present invention there is provided a repeater for use in the system according to said one aspect, said repeater including means for demodulating frequency or phase modulation applied to the data signals on a digital transmission link, logic means for processing the demodulated signals, and means for phase or frequency modulating data signals on the data link in accordance with signals from said logic means. The demodulating means may include a phase locked loop circuit. Alternatively the demodulating means may include a surface acoustic wave device or similar filter.

The invention will be described now by way of example only with particular reference to the accompanying drawings. In the drawings.

Figure 1:
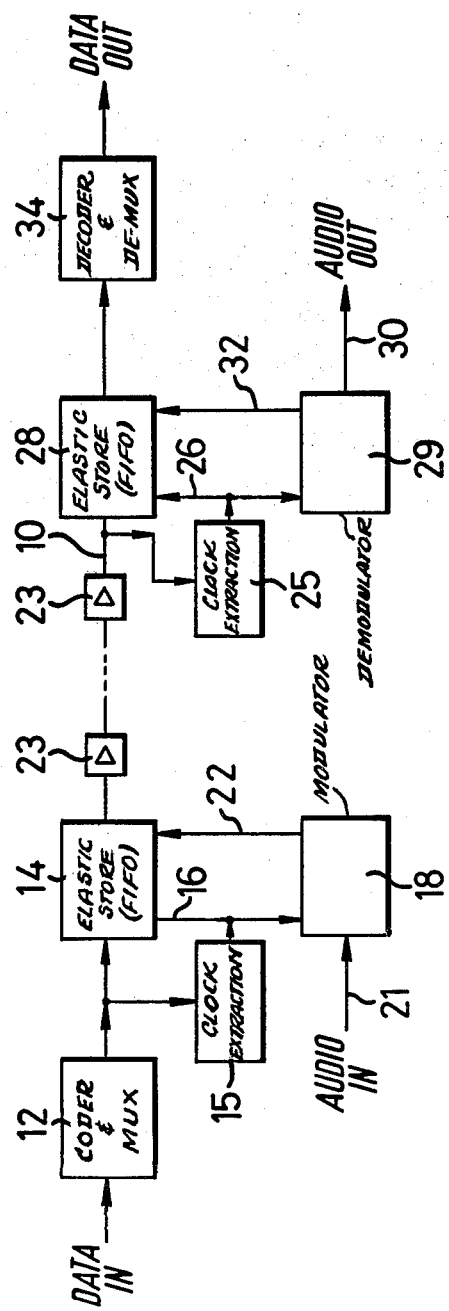
FIG. 1 is a block schematic diagram of one embodiment of the present invention.

FIG. 1 shows a digital transmission system in which a supervisory or service channel is provided by frequency modulating the data rate. The arrangement is designed particularly for a submarine optical fibre link but it can be used with other forms of transmission link. At the send end of the link 10 a coder and multiplexer circuit 12 receives the basic data signals, which are coded and multiplexed and fed to an elastic store 14 (also known as a FIFO). A clock extraction circuit 15 extracts clock information from the output signal of the coder 12 and provides a clock input at terminal 16 for the elastic store 14. This input controls the rate at which data is read into the store 14.

The extraction circuit 15 also provides an input to a modulator 18. The modulator 18 has another input 21 to which are fed audio signals for transmission on the service or supervisory channel. The modulator 18 modulates the clock rate received from the extraction circuit 15 in accordance with the audio signal at input 21 and provides a modulated clock signal on line 22. This signal controls the rate at which data is read out of the elastic store 14 onto the highway 10. Thus it will be seen that the data signal transmitted on the highway 10 is frequency modulated. This frequency modulation provides a channel which can be used for service and supervisory purposes. The highway 10 includes a plurality of repeaters 23 as is conventional in a transmission link. The repeaters incorporate modulation and demodulation allowing them to be addressed and interrogated individually from the terminal equipment via the supervisory channel. A detailed description of the repeaters will be given later.

At the receive end of the highway 10 a clock extraction circuit 25 extracts the basic clock information and provides a clock signal on line 26 which controls the rate at which the data is read into an elastic store 28.

The output of the clock extraction circuit 25 is also fed to a demodulator circuit 29 which recovers the original audio signal to provide an output on line 30. The circuit 29 also regenerates the original unmodulated clock rate to provide a clock signal on line 32 which controls the rate at which the data is read out from the elastic store 28. The output from the store 28 is fed to a decoder and demultiplexer circuit 34.

It will be appreciated that the arrangement described above operates by introducing jitter to the transmitted signal. Some consideration needs to be given to the acceptability of such jitter.

Consider a system operating at say 100 Mbit/s with various peak FM deviations applied. The resulting bit period error can thus be expressed in the form:

$$T = \frac{1}{f_m} - \frac{1}{f_m + \Delta f} = T_o \left(1 - \frac{1}{1 + \frac{\Delta f}{f_m}}\right) \quad 1$$

$$= T_o - \Delta T \quad 2$$

Where $f_m$ = the data rate $T_o = \frac{1}{f_m}$ = the data period and $\Delta f$ = the peak deviation of the FM.

Thus with a basic bit period of 10 ns we may tabulate the timing error as a function of peak deviation '$\Delta f$' as follows:

| f | T | Effective Peak Jitter |
|---|---|---|
| 100 Hz | 0.01 ps | 0.0001% |
| 1 kHz | 0.10 ps | 0.001% |
| 10 kHz | 1.00 ps | 0.01% |
| 100 kHz | 9.99 ps | 0.1% |
| 1 MHz | 99.01 ps | 1.0% |

From these results it is clear that an adequate band-width is available for supervisory purposes and can, moreover, be accommodated without introducing any significant jitter penalty provided the peak deviation of the frequency modulation is restricted. Furthermore, as system bit rates increase, then the effective band-width also appears to increase for a given jitter tolerance.

The arrangement described with reference to FIG. 1 depends upon the effective transparency of cascaded repeaters, and that of their timing recovery circuits, for the propagation of the FM content of the bit stream. In the case of Phase Locked Loop (PLL) or Injection Locked Oscillator (ILO) timing recovery circuits, the practical limitation to the maximum frequency deviation of the FM is related to the capture range and response time of the particular scheme. Provided the FM component is constrained within a limited range, the repeaters are, for all practical purposes, transparent. However, this is not so for timing recovery schemes that employ tuned elements such as crystals, SAW devices and tank circuits.

Cascading tuned filters results in a progressive reduction in the available band-width. For example, the cascading of repeaters with tank circuits used for timing recovery is analogous in form to an IF amplifier. Thus, if the band-width of a single stage is $B_o$ Hz, then after N such cascaded (and electrically isolated) stages the resultant 3 dB bandwidth is given by:

$$B_T = B_o(2^{1/N} - 1)^{\frac{1}{2}} \text{ Hz} \quad 3$$

Where $$B_o = \frac{f_m}{Q} \quad 4$$

Thus, if we assume, by way of an example, a system with:

$f_m = 160$ M Baud $Q = 100$ $N = 100$ then the effective band-width of a single stage would be:

$$B_o = \frac{f_m}{Q} = 1.6 \text{ MHz} \quad 5$$

and this would be reduced, after 100 cascaded repeaters, to:

$$B_T = 133 \text{ kHz} \quad 6$$

Hence it appears that on the longest of systems there should be available sufficient band-width for an adequate supervisory channel.

Having established that sufficient bandwidth will be available for a substantial number of cascaded repeaters, and that the degrading effect of the FM component on the main data path is insignificant for restricted deviations, it is now worth considering the various degrading effects likely to be inflicted upon the supervisory channel. If we assume a system employing a peak frequency deviation of less than 50 kHz or so, then any transmission imperfection must generate components within this range to degrade the supervisory channel. It is thus unlikely, in the case of systems operating at 160 M Baud or above, that pattern dependent effects due to laser phenomena or poor equalisation would influence such a channel. To do so would dictate repetitive processes with periods of 20 us or more. The use of short sequence scramblers and coders make such an event highly improbable. Even justification and frame alignment components fall outside the 50 kHz band on the class of system ($\leq$ 160 M Baud) being considered.

The remaining principal cause of supervisory channel performance degradation is thus likely to be due to slowly varying random jitter components. Analysis of the S/N limitations imposed by such components is possible by classical FM theory and gives a demodulated S/N ratio prediction of the form:

$$\frac{S}{N} \text{Demod} = \frac{K\beta^2}{\sigma_2} \qquad 7$$

where
$\beta$ is the modulation index
$\sigma$ is the rms jitter
and
$\kappa$ is a constant.

Even for large (approaching 100%) amounts of jitter this result predicts that workable S/N (>20 dB) can still be achieved with frequency deviations of less than 0.05% of the data rate.

In the arrangement shown in FIG. 1 the supervisory or service channel allows information to be readily recovered at the repeaters 23 along the link. One possible arrangement for internal modulation and demodulation of the supervisory information within a repeater is shown in FIG. 2.

The repeater comprises a receiver 40 whose output is connected by a decision circuit 41 to a transmitter 42 which transmits regenerated data in a conventional manner. The output of the receiver 40 is also connected by a non-linear network 44 to a phase locked loop timing recovery circuit 45. The phase locked loop which comprises a multiplier 46, phase sensitive detector 47, and voltage controlled oscillator 48 extracts timing information from the received signal to provide signals for controlling the decision circuit as in normal repeater practice. The phase locked loop also in conjunction with a resistor 50 and a capacitor 51 incorporates the necessary demodulation to demodulate the supervisory signal from the terminal equipment. The demodulated supervisory signal appears on a line 53 and is fed to a tone decoder 54 and a series of filters 55. The tone decoder 54 which can be an MOS device includes three tone selection filters 56, 57, 58 whose outputs are gated by a gate 60 and is provided so that independent addressing of repeaters can be carried out. Each repeater can be characterised by three from a number, e.g. 10 of tones. When the tone decoder 54 receives the three tones which characterise its repeater, the outputs of the filters 56, 57, 58 are gated to provide a repeater indentification signal at the output of the gate 60. Thus it can be seen that each repeater can be assigned a specific identification code to allow it to be interrogated independently.

The filters 55 are arranged to receive tones representing interrogation signals. Although three such filters are shown in FIG. 2 there can be as many filters as there are interrogation signals. The corresponding tone can be used for interrogating the corresponding condition at all repeaters. Examples of the conditions which can be interrogated are the receiver automatic gain control, error rate and laser drive.

Figure 2:
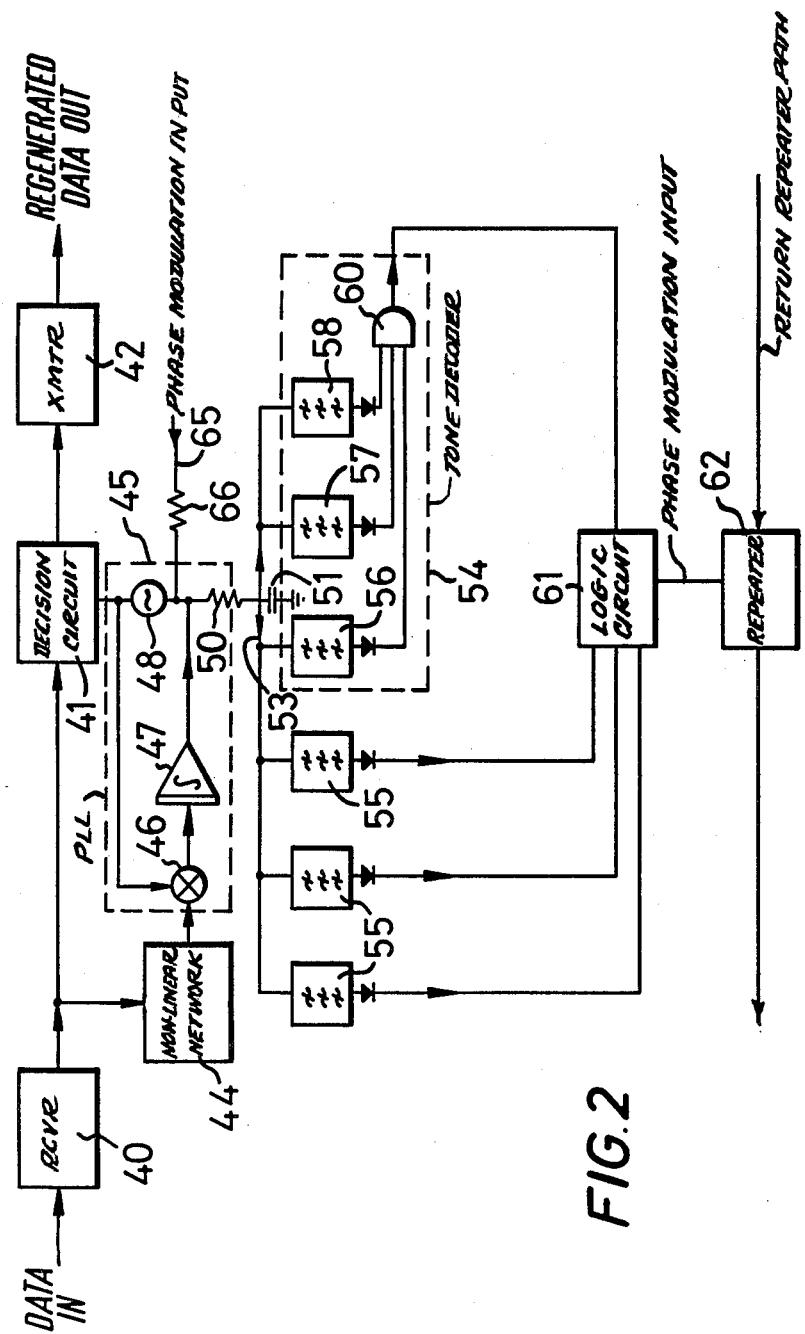
FIG. 2 is a block schematic diagram of a repeater which allows reception at a point along the link of FIG. 1.

The interrogation of a condition can be by a logic circuit which is illustrated at 61 in FIG. 2. The output from the logic circuit 61 is connected to a phase modulation input of the associated repeater which is shown at 62 in FIG. 2. It will be appreciated by those skilled in the art that for each repeater there is an associated repeater in the return path of the link. This associated repeater has a structure identical to that shown in FIG. 2. The phase modulation input is shown at 65 and includes a resistor 66. Any signal fed from the logic circuit 61 phase modulates the data signal on the digital link so that a signal indicative of its condition interrogated is transmitted back to the terminal station by that phase modulation. This signal can be recovered by an appropriate demodulator at the terminal station.

One example of a bandplan which can be used for the tones is given in the following table.

| Low Band | | High Band |
| --- | --- | --- |
| $f_0 = 4.00$ kHz | $f_5 = 5.80$ kHz | $f_{13} = 10.50$ kHz |
| $f_1 = 4.31$ kHz | $f_6 = 6.24$ kHz | $f_{14} = 11.30$ kHz |
| $f_2 = 4.64$ kHz | $f_7 = 6.72$ kHz | $f_{15} = 12.17$ kHz |
| $f_3 = 5.00$ kHz | $f_8 = 7.24$ kHz | $f_{16} = 13.11$ kHz |
| $f_4 = 5.38$ kHz | $f_9 = 7.80$ kHz | $f_{17} = 14.12$ kHz |

This bandplan assumes filter bandwidths of approximately 100 Hz centred on the logarithmically related frequencies given. The 4–8 kHz band can be used for terminal to repeater communication and the 10–15 KHz band for repeater to terminal communication. For the bandplan given above a 4-bit elastic store can accommodate the buffering requirement of a system operating at 140 Mbits/sec.

Figure 3:
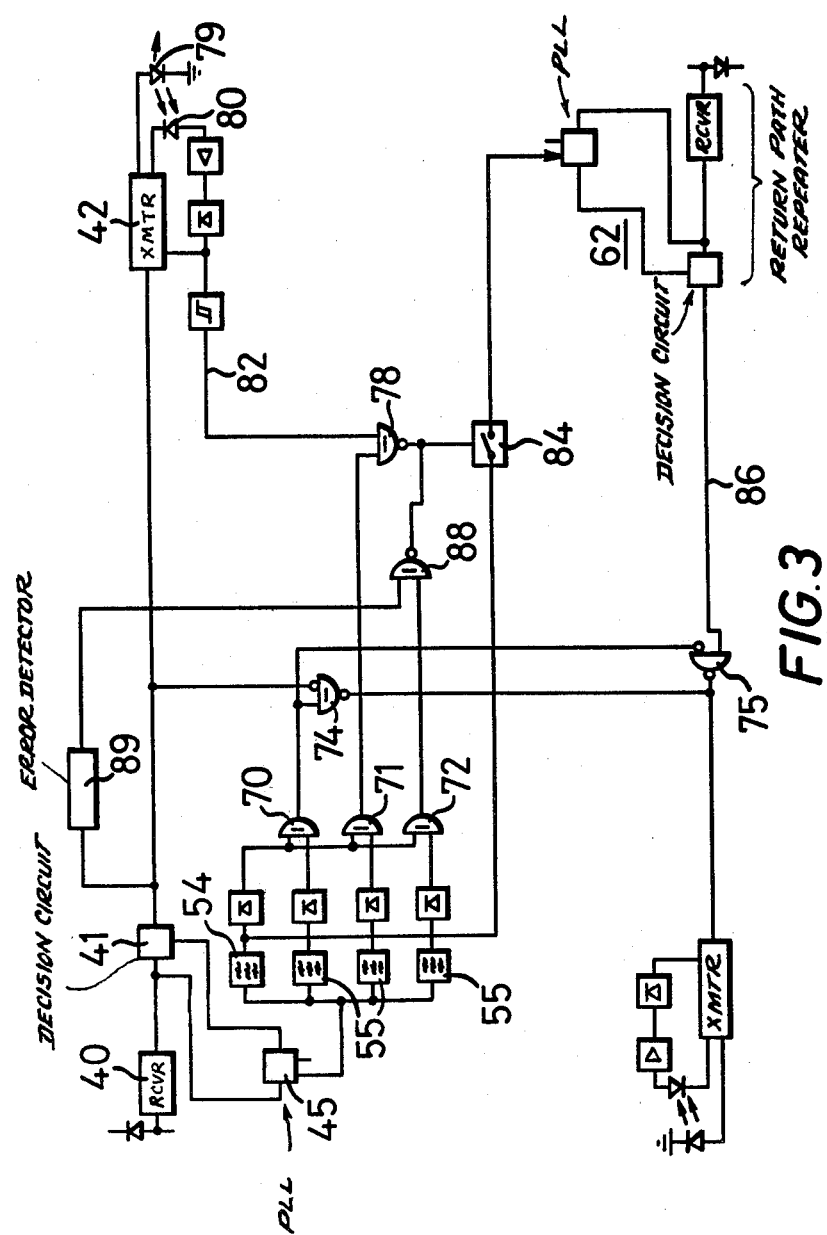
FIG. 3 is a block schematic diagram showing one example of the logic circuit of FIG. 2.

One example of a logic circuit 61 is given in FIG. 3. In this figure elements corresponding to the elements of FIGS. 1 and 2 are shown by like reference numerals. The repeater selection signal from the gate 60 is used to gate the interrogation tones from the filters through gates 70 to 72. The output from gate 70 is applied to gates 74 and 75 which provide a loop back to the terminal station.

The output of the gate 71 is applied to a gate 78 and is used to interrogate the condition of the laser 79 of the transmitter. The output of the laser 79 is sensed by a photodiode 80 and a logic signal indicative of the laser output is fed to the gate 78 over line 82. The output of the gate 78 is fed via an analogue gate 84 to the phase modulating input of the associated repeater shown at 62. The signal indicative of the condition of the laser is then fed back to the terminal station as a phase modulation of the data signals on the return path shown at 86.

The output of the gate 72 is applied to a gate 88 which also receives the output from an error detector 89. The output from the gate 88 is fed via the analogue gate 84 to the repeater 62 so that a signal indicative of the bit error rate can be fed back to the terminal station by phase modulation of the data signals on the return path 86.

Figure 4:
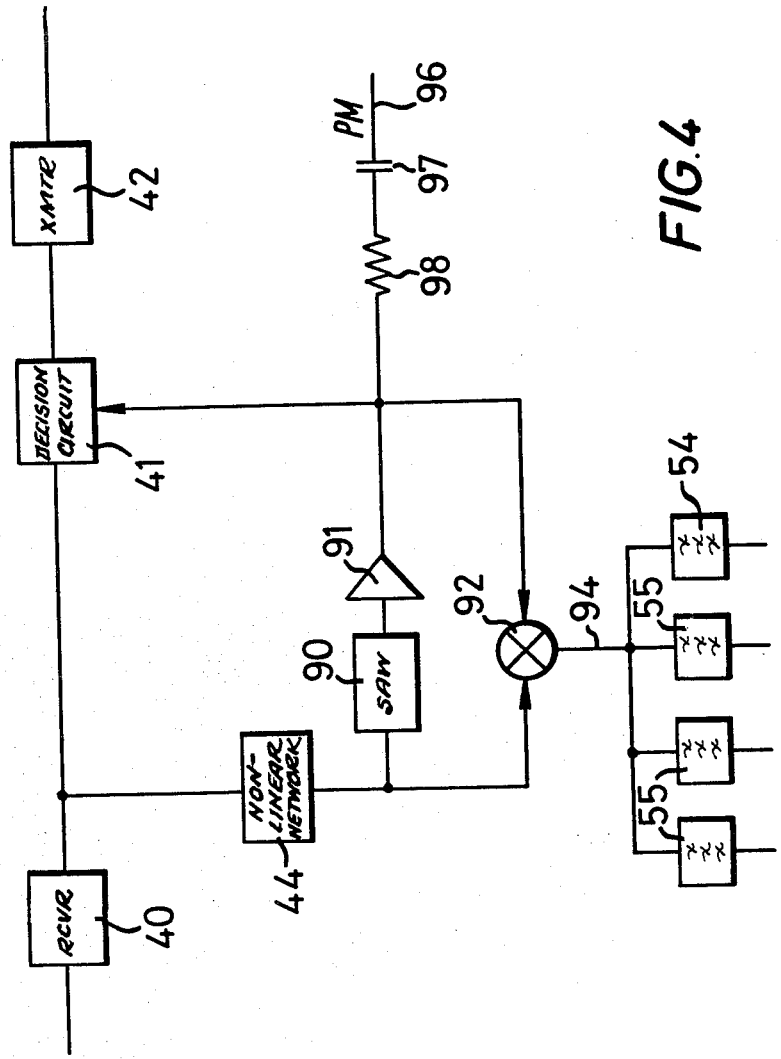
FIG. 4 is a block schematic diagram showing an alternative form of repeater.

The repeater shown in FIG. 2 employs a phase locked loop circuit. An alternative form of repeater which can be used is shown in FIG. 4. In this repeater the non-linear network is connected to a surface acoustic wave (SAW) device 90 or similar filter. The output of the SAW 90 is connected by an amplifier 91 to the decision circuit and also to a multiplier 92 which also receives the output of the non-linear network. The SAW 90 extracts the timing information for the decision circuit and also demodulates the frequency modulation, the demodulated signal appearing at 94 and being applied to the tone decoder and filters as described with reference to FIG. 2. The phase modulation input from the associated repeater is shown at 96 and includes a capacitor 97 and resistor 98.

A SAW device has the advantage over a phase locked loop circuit that it is more stable.

The technique of providing a service or supervisory channel by frequency modulating the data rate has been tested on a 120 M bit/sec system incorporating 48 dependent repeaters. Results show that the technique is viable provided the deviation of the frequency modulation is restricted. Typically the deviation should be of the order of 50 kHz or less.

The implementation described with reference to FIG. 1 uses elastic stores. An alternative method of implementation is to directly frequency modulate the clock supplied to the final multiplex of the system at its sending end. This may not prove practicable as it requires modification of the justification scheme to cope with the additional variation in clock frequency. This method may, however, be practicable in very high bit rate systems where modulation represents a very small percentage of the nominal clock frequency.

The present technique has been designed for submarine optical fibre systems where it will be useful since it avoids having to enter the complex multiplexing hierarchy of the data signals. Furthermore the need for metallic conductors other than power feed conductors is avoided. The technique is not limited to such application and it can be used on inland optical transmission systems as well as coaxial cable and radio systems.

We claim:

1. A digital data transmission system having send and receive equipment at terminal stations connected by a digital data communication link which includes one or more repeaters, wherein the send equipment includes means for frequency or phase modulating the occurrence timing of digital data carrying signals being transmitted along the link with additional information, and the or each repeater includes means for demodulating said frequency or phase modulation thus providing said additional information thereat, said modulation providing a supervisory channel by means of which the repeaters can be addressed and interrogated while simultaneously communicating said digital data carrying signals over said link.

2. A digital data transmission system as claimed in claim 1 wherein the supervisory channel is arranged to carry a plurality of tones simultaneously with said data carrying signals, each tone or combination of tones being associated with a particular repeater, and each repeater includes means for sensing its tone or combination of tones so that each repeater can be addressed independently.

3. A digital data transmission system as claimed in claim 2 wherein the supervisory channel is arranged to carry one or more further tones simultaneously with said data carrying signals, each further tone being for interrogating a given condition of the repeater.

4. A digital data transmission system as claimed in claim 3 wherein each repeater includes means for gating said further tones to a logic circuit by means of a signal from said sensing means, said logic circuit being responsive to said interrogation tone or tones to provide signals indicative of the interrogated conditions.

5. A digital data transmission system as claimed in claim 4 wherein each repeater includes means for phase modulating the data signals on the data link in accordance with the signals from said logic means whereby said condition indicative signals can be transmitted to said receive equipment.

6. A digital data transmission system as claimed in any of claims 1, 2, 3, 4 or 5 wherein the frequency modulating means includes a digital data store whose read-out rate can be arranged to vary relative to its read-in rate.

7. A digital data transmission system as claimed in claim 6 wherein the receive equipment also includes a digital data store whose read-out data can be arranged to vary relative to its read-in rate.

8. A digital data transmission system as claimed in claim 6 wherein said digital data stores are elastic stores.

9. A method of interrogating repeaters on a digital data transmission link connecting terminal stations, said method comprising frequency or phase modulating the occurrence timing of digital data carrying signals being transmitted from a terminal station with additional information to provide a supervisory channel and demodulating said frequency or phase modulation of each repeater thus providing said additional information thereat to obtain signals for interrogating a condition or conditions in the repeater while simultaneously communicating said digital data carrying signals over said link.

10. A method as claimed in claim 9 including the step of phase or frequency modulating the occurrence timing of digital data carrying signals being communicated on the return path from each repeater to the terminal station in accordance with signals indicative of the interrogated condition.

11. A repeater for use in the system claimed in any one of claims 1 to 5, said repeater including means for demodulating the frequency or phase modulation applied to the digital data carrying signals on a digital transmission link, logic means for processing the demodulated signals, and means for phase or frequency modulating digital data carrying signals on the data link in accordance with signals from said logic means.

12. A repeater as claimed in claim 11 wherein said demodulating means includes a phase locked loop circuit.

13. A repeater as claimed in claim 11 wherein said demodulating means includes a surface acoustic wave device.

14. A repeater for a digital data transmission link including a logic means arranged to provide signals indicative of the condition of the repeater and means for phase modulating the occurrence timing of digital data carrying signals on the digital data transmission link in accordance with the signals from the logic means.

15. A repeater according to claim 14, including additional means for demodulating frequency modulation of the occurrence timing of digital data carrying signals on the digital data transmission link and means for processing the demodulated signals, said logic means being responsive to the processed demodulated signals.

16. A digital data transmission system having send and receive equipment at terminal stations connected by a digital data link which includes one or more repeaters according to claim 15 and wherein the send equipment includes means for frequency modulating the occurrence timing of digital data carrying signals being transmitted along the link, and the receive equipment includes means for demodulating phase-modulated occurrence timing of digital data carrying signals.

* * * * *